(12) United States Patent
Gupta et al.

(10) Patent No.: US 11,418,137 B1
(45) Date of Patent: Aug. 16, 2022

(54) MOTOR DRIVER CURRENT SENSING

(71) Applicant: Texas Instruments Incorporated, Dallas, TX (US)

(72) Inventors: Sayantan Gupta, Bengaluru (IN); Sooping Saw, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/235,569

(22) Filed: Apr. 20, 2021

(51) Int. Cl.
*H02P 6/28* (2016.01)
*H02P 7/29* (2016.01)
*H02P 21/22* (2016.01)

(52) U.S. Cl.
CPC ...................................... *H02P 6/28* (2016.02)

(58) Field of Classification Search
CPC .......... H02P 6/28; H02P 2205/01; H02P 7/29; H02P 21/22
See application file for complete search history.

(56) References Cited

U.S. PATENT DOCUMENTS

| | | | |
|---|---|---|---|
| 9,128,500 B2* | 9/2015 | Daniel | H02M 3/1563 |
| 2015/0280625 A1* | 10/2015 | Boscolo Berto | H02P 27/08 318/400.32 |
| 2017/0187278 A1* | 6/2017 | Yamaguchi | H02H 7/1213 |
| 2020/0395842 A1* | 12/2020 | Evans | H02M 1/34 |
| 2021/0050782 A1* | 2/2021 | Bandyopadhyay | H02M 3/158 |

* cited by examiner

*Primary Examiner* — Thai T Dinh
(74) *Attorney, Agent, or Firm* — John R. Pessetto; Charles A. Brill; Frank D. Cimino

(57) ABSTRACT

A motor driver includes a low-side drive transistor, a comparator, a sense transistor, first switch, and a second switch. The low-side drive transistor is adapted to be coupled to a motor. The comparator is configured to determine a direction of a drive current flowing in the low-side drive transistor. The sense transistor is coupled to the low-side side drive transistor and is configured to pass a replica of the drive current. The first switch is configured to couple the sense transistor to the low-side drive transistor responsive to the drive current flowing in a first direction through the low-side drive transistor. The second switch is configured to couple the sense transistor to a ground responsive to the drive current flowing in a second direction, that is opposite the first direction, through the low-side drive transistor.

20 Claims, 3 Drawing Sheets

MOTOR DRIVER CURRENT SENSING

BACKGROUND

A typical brushless DC motor has permanent magnets that rotate and a fixed armature, eliminating problems associated with connecting current to a moving armature as in brushed DC motors. In a brushed DC motor, a brush/commutator assembly continually switches the phase to the windings to keep the motor turning. An electronic controller coupled to the brushless DC motor provides similar timed power distribution using a solid-state circuit in place of the brush/commutator system. The controller includes half bridges that drive the windings of the motor, and current sensors that measure the current flowing in the windings.

SUMMARY

In one example, a motor driver includes a low-side drive transistor, a sense transistor, a comparator, a first switch and a second switch. The low-side drive transistor includes a control terminal, a first current terminal, and a second current terminal. The first current terminal is coupled to a ground. The sense transistor includes a control terminal, a first current terminal, and a second current terminal. The control terminal of the sense transistor is coupled to the control terminal of the low-side drive transistor. The comparator includes a first input, a second input, and an output. The first input is coupled to the second current terminal of the low-side drive transistor. The second input is coupled to the ground. The first switch includes a first terminal, a second terminal, and a control terminal. The first terminal of the first switch is coupled to the second current terminal of the low-side drive transistor. The second terminal of the first switch is coupled to the second current terminal of the sense transistor. The control terminal of the first switch is coupled to the output of the comparator. The second switch includes a first terminal, a second terminal, and a control terminal. The first terminal of the second switch coupled to the first current terminal of the sense transistor. The second terminal of the second switch is coupled to the ground. The control terminal of the second switch is coupled to the output of the comparator.

In another example, a motor driver includes a low-side drive transistor, a comparator, a sense transistor, a first switch, and a second switch. The low-side drive transistor is adapted to be coupled to a motor. The comparator is configured to determine a direction of a drive current flowing in the low-side drive transistor. The sense transistor is coupled to the low-side side drive transistor and is configured to pass a replica of the drive current. The first switch is configured to couple the sense transistor to the low-side drive transistor responsive to the drive current flowing in a first direction through the low-side drive transistor. The second switch is configured to couple the sense transistor to a ground responsive to the drive current flowing in a second direction, that is opposite the first direction, through the low-side drive transistor.

In a further example, a motor driver includes a low-side drive transistor, a sense transistor, a sense amplifier, a current-to-voltage converter, and a difference amplifier. The low-side drive transistor is configured to drive a motor. The sense transistor is coupled to the low-side drive transistor, and is configured to pass a sense current that is proportional to a drive current flowing through the low-side drive transistor in a first direction and in a second direction. The sense amplifier is coupled to the sense transistor, and is configured to sense a voltage across the sense transistor. The current-to-voltage converter is coupled to the sense amplifier, and is configured to convert the sense current to a sense voltage. The difference amplifier is coupled to the current-to-voltage converter, and is configured to invert the sense voltage relative to a reference voltage responsive to the drive current flowing in the first direction through the low-side drive transistor.

BRIEF DESCRIPTION OF THE DRAWINGS

For a detailed description of various examples, reference will now be made to the accompanying drawings in which.

The same reference numbers are used in the drawings to depict the same or similar (by structure and/or functionality) features.

DETAILED DESCRIPTION

A motor driver needs accurate bi-directional current sensing to efficiently drive a brushless DC motor. For example, accurate current sensing is needed to estimate rotor position in a motor, because rotor position error results in loss of efficiency. The motor control algorithm (e.g., field oriented control) requires high linearity across the current range for both positive and negative direction of current flow and low distortion at the zero-crossings for the current. Conventional motor drivers sense current using two sense transistors and two sense amplifiers. A first sense transistor/sense amplifier measures positive current flow into a low-side drive transistor of a half-bridge, and a second sense transistor/sense amplifier measures negative current flow from the low-side drive transistor. Differences in gain and offset of the two separate sensing paths cause non-linearity and zero-crossing distortion in the sensed current.

The motor driver of some example embodiments uses a single sensing path, having a single sense transistor and a single sense amplifier, to sense both positive and negative current flow through a low-side drive transistor. The single sensing path reduces distortion and improves linearity relative to two sensing paths. Use of a single sense amplifier reduces circuit area and manufacturing cost. For example, the single sensing path reduces die size and trim cost (only one sense amplifier needs to be trimmed) relative to two sensing paths.

Figure 1:
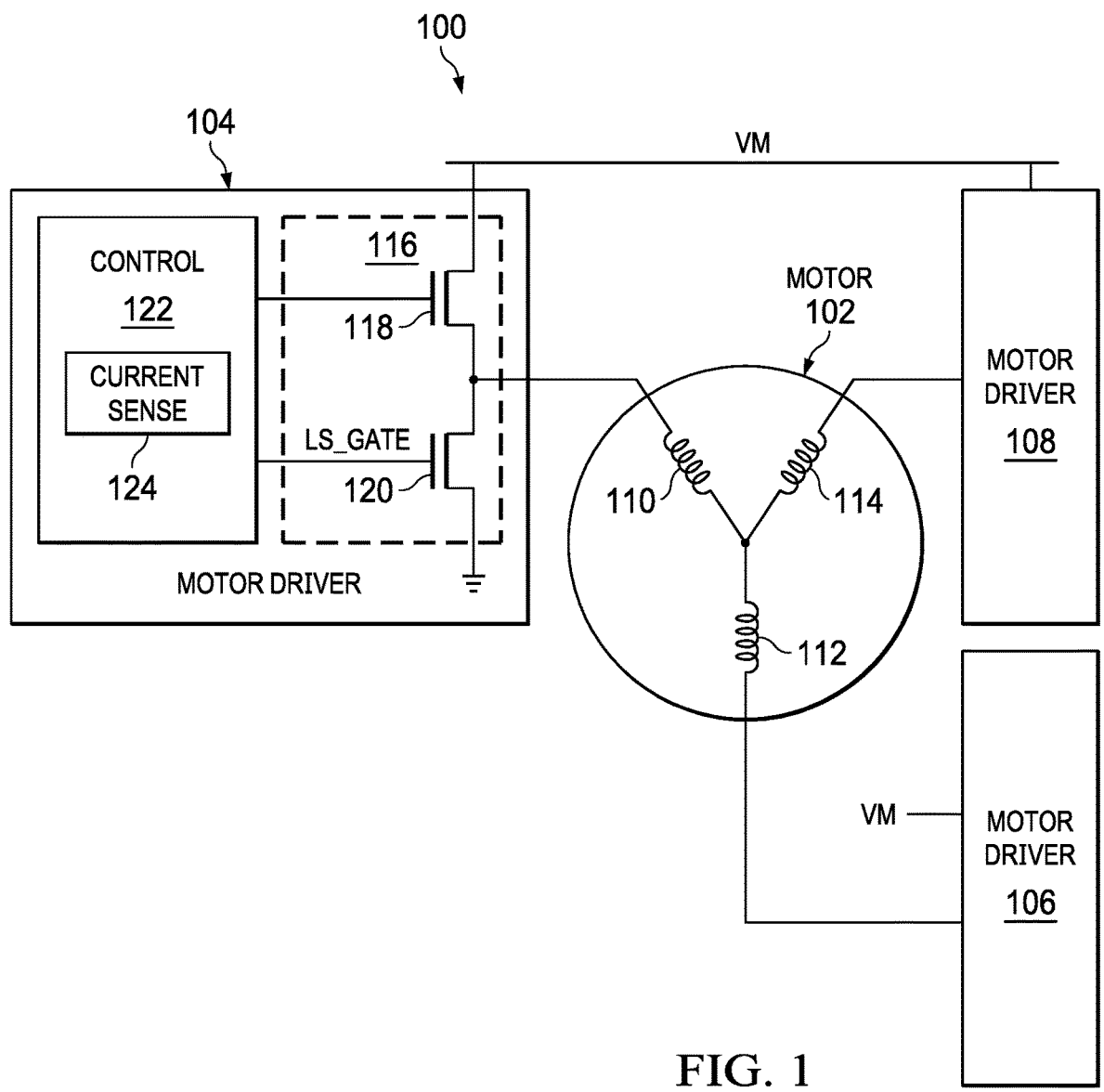
FIG. 1 is a block diagram of an example electric motor system.

FIG. 1 illustrates an electric motor system 100 of some example embodiments. The electric motor system 100 includes an electric motor 102 and motor drivers 104, 106, and 108. The electric motor 102 includes windings 110, 112, and 114 respectively coupled to the motor drivers 104, 106, and 108. The motor drivers 104, 106, and 108 source current to and sink current from the windings 110, 112, and 114 to activate the electric motor 102. The motor driver 106 and the motor driver 108 may be implemented using the same (or similar) configuration/features as used in the motor driver 104.

The motor driver 104 includes a half-bridge 116 and a control circuit 122. The half-bridge 116 is coupled to the winding 110 for sourcing current to the winding 110 and sinking current from the winding 110. The half-bridge 116 includes a high-side drive transistor 118 and a low-side drive transistor 120, each coupled to the winding 110. The low-side drive transistor 120 may be a N-channel metal-oxide-semiconductor field effect transistor (nMOSFET), and the high-side drive transistor 118 may an nMOSFET or a P-channel metal-oxide-semiconductor field effect transistor (pMOSFET).

The control circuit 122 is coupled to the half-bridge 116, and controls the high-side drive transistor 118 and the low-side drive transistor 120. For example, the control circuit 122 may include pulse width modulation circuitry that generates signals for turning the high-side drive transistor 118 and the low-side drive transistor 120 on and off as needed to operate the electric motor 102. The control circuit 122 includes current sense circuit 124. The current sense circuit 124 measures the current flowing through the low-side drive transistor 120 (current flowing both to ground and from ground through the low-side drive transistor 120). The control circuit 122 applies the current measurements provide by the current sense circuit 124 to control the half-bridge 116. The current sense circuit 124 senses the current flowing in the low-side drive transistor 120 using a single sensing path. The single sensing path provides improved linearity and reduced distortion relative to current sensing circuitry the employs two sensing paths.

Figure 2:
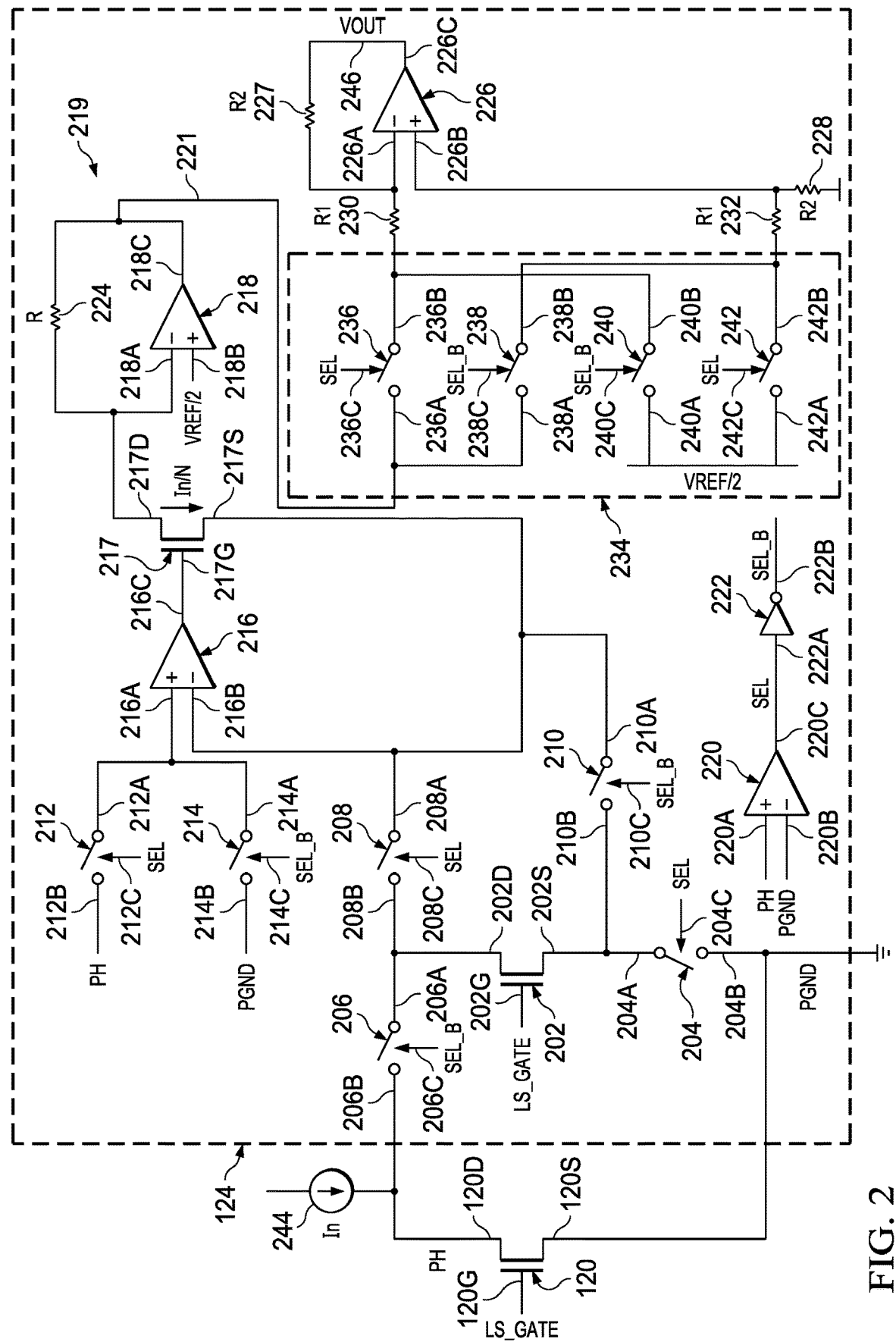
FIG. 2 is a circuit diagram of an example current sense circuit suitable for use in a motor driver.

FIG. 2 illustrates an example of the current sense circuit 124. The current sense circuit 124 includes a sense transistor 202, a sense amplifier 216, current-to-voltage converter circuit 219, a difference amplifier 226, and a comparator 220. The comparator 220 identifies the direction of current flow through the low-side drive transistor 120. Based on the identified direction of current flow through the low-side drive transistor 120, switches 204, 206, 208, 210, 212 and 214 control connections of the sense transistor 202 and the sense amplifier 216 to allow sensing of current flowing through the low-side drive transistor 120 in either direction (positive, drain-to-source, and negative, source-to-drain).

A terminal 220A of the comparator 220 is coupled to a current terminal 120D (drain terminal) of the low-side drive transistor 120, and a terminal 220B of the comparator 220 is coupled to ground. If the voltage at the current terminal 120D is above ground, then positive current is flowing through the low-side drive transistor 120. If the voltage at the current terminal 120D is below ground, then negative current is flowing through the low-side drive transistor 120. The output signal of the comparator 220 is active to indicate positive current flow in the low-side drive transistor 120. An inverter 222 is coupled to the output 220C (SEL) of the comparator 220, and output signal (SEL_B) of the inverter 222 is active (e.g. a logic "high" or "1") to indicate negative current flow in the low-side drive transistor 120.

The sense transistor 202 is a scaled replica of the low-side drive transistor 120. For example, the width of the drain-source channel of the sense transistor 202 may be 1/Nth that of the low-side drive transistor to produce a sense current that 1/Nth of the current flowing in the low-side drive transistor 120. The sense transistor 202 includes a control terminal 202G (gate terminal) that is coupled to a control terminal 120G (gate) of the low-side drive transistor 120. If the comparator 220 identifies current flowing through the low-side drive transistor 120 to ground (positive current, e.g., current flowing from the drain to the source), then the switch 204 couples a current terminal 202S (source terminal) of the sense transistor 202 to ground, and the switch 208 couples the current terminal 202D (drain terminal) of the sense transistor 202 to the input 216B (inverting or negative input) of the sense amplifier 216. Under these conditions, the sense amplifier 216 causes the voltage at the input 216B of the sense amplifier 216 to equal the voltage (PH) at the input 216A (non-inverting input) of the sense amplifier 216. That is, the sense amplifier 216 generates an output voltage based on the difference of the voltages at the inputs 216A and 216B, and when operating with negative feedback as in FIG. 2, the sense amplifier 216 generates an output signal that forces the voltage at the input 216B of the sense amplifier to equal the voltage (PH) at the input 216A of the sense amplifier 216. When positive current is flowing in low-side drive transistor 120, the switch 212 couples the input 216A of the sense amplifier 216 to the current terminal 120D (drain) of the low-side drive transistor 120. Thus, when positive current is flowing in the low-side drive transistor 120, the voltage at the current terminal 202D of the sense transistor 202 is the same as the voltage at the current terminal 120D of the low-side drive transistor 120, the voltage at the current terminal 202S of the sense transistor 202 is the same as the voltage at the current terminal 120S of the low-side drive transistor 120, and the current flowing in the sense transistor 202 is a scaled replica of the current flowing in the low-side drive transistor 120. The switch 206 is open when positive current is flowing through the low-side drive transistor 120 so that the scaled current (In/N) flowing in the sense transistor 202 flows from the pass transistor 217, i.e., the current terminal 202D of the sense transistor 202 is isolated from the current terminal 120D of the low-side drive transistor 120.

The switch 204 includes a terminal 204A coupled to the current terminal 202S of the sense transistor 202, a terminal 204B coupled to ground, and a control terminal 204C coupled to the output 220C (SEL) of the comparator 220. The switch 208 includes a terminal 208A coupled to the input 216B of the sense amplifier 216, a terminal 208B coupled to the current terminal 202D of the sense transistor 202, and a control terminal 208C coupled to the output 220C (SEL) of the comparator 220. The switch 212 includes a terminal 212A coupled to the input 216A of the sense amplifier 216, a terminal 212B coupled to the current terminal 120D of the low-side drive transistor 120, and a control terminal 212C coupled to the output 220C (SEL) of the comparator 220.

If the comparator 220 identifies current flowing through the low-side drive transistor 120 from ground (negative current), the switch 206 couples the current terminal 202D of the sense transistor 202 to the current terminal 120D of the low-side drive transistor 120, and the switch 210 couples the current terminal 202S of the sense transistor 202 to the input 216B of the sense amplifier 216. When negative current is flowing in low-side drive transistor 120, the switch 214 couples the input 216A of the sense amplifier 216 to ground (PGND). Operation of the sense amplifier 216 causes the voltage at the input 216B to equal the voltage at the input 216A of the sense amplifier 216. That is, the sense amplifier 216 generates an output voltage based on the difference of the voltages at the inputs 216A and 216B, and when operating with negative feedback as in FIG. 2, the sense amplifier 216 generates an output signal that forces the voltage at the input 216B of the sense amplifier to equal the voltage (PGND) at the input 216A of the sense amplifier 216. Thus, when negative current is flowing in the low-side drive transistor 120: 1) the voltage at the current terminal 202D of the sense transistor 202 is the same as the voltage at the current terminal 120D of the low-side drive transistor 120 due to closure of the switch 206; 2) the voltage at the current terminal 202S of the sense transistor 202 is the same as the voltage (PGND) at the current terminal 120S of the low-side drive transistor 120 because the current terminal 202S of the sense transistor 202 is coupled to ground at the input 216B of the sense amplifier 216 via the switch 208; and 3) the current flowing in the sense transistor 202 is a scaled replica of the current flowing in the low-side drive transistor 120.

The switch 206 includes a terminal 206A coupled to the current terminal 202D of the sense transistor 202, a terminal 206B coupled to the current terminal 120D of the low-side drive transistor 120, and a control terminal 206C coupled to the output 222B (SEL_B) of the inverter 222. The switch 210 includes a terminal 210A coupled to the input 216B of the sense amplifier 216, a terminal 210B coupled to the current terminal 202S of the sense transistor 202, and a control terminal 210C coupled to the output 222B (SEL_B) of the inverter 222. The switch 214 includes a terminal 214A coupled to the input 216A of the sense amplifier 216, a terminal 214B coupled to ground, and a control terminal 214C coupled to the output 222B (SEL_B) of the inverter 222.

A pass transistor 217 is coupled between the output 216C of the sense amplifier 216 and the input 216B of the sense amplifier 216. The current flowing through the pass transistor 217 is the same magnitude as the current flowing through the sense transistor 202. That is, the current flowing through the pass transistor 217 is the absolute value of the current flowing through the sense transistor 202. The current flowing through the pass transistor 217 is always positive, while the current flowing through the sense transistor 202 is positive or negative (as per the current flowing in the low-side drive transistor 120). A control terminal 217G of the pass transistor 217 is coupled to the output 216C of the sense amplifier 216, and a current terminal 217S (source) of the pass transistor 217 is coupled to the input 216B of the sense amplifier 216.

The current-to-voltage converter circuit 219 is coupled to the pass transistor 217 to convert the current flowing through the pass transistor 217 to a voltage that is proportional to the current flowing through the low-side drive transistor 120. The current-to-voltage converter circuit 219 includes an amplifier 218 and a resistor 224. An input 218A (inverting input) of the amplifier 218 is coupled to a current terminal 217D (drain) of the pass transistor 217, and an input 2186 (non-inverting input) of the amplifier 218 is coupled to a reference voltage source (not shown) for receipt of a reference voltage (VREF/2). VREF may be, for example, a reference voltage of an analog-to-digital converter used to digitize the sense voltage 246 output (VOUT) by the current sense circuit 124. The output 218C of the amplifier 218 is coupled to the input 218A of the amplifier 218 via the resistor 224.

The output voltage 221 of the amplifier 218 is:

$$\frac{VREF}{2} + \frac{InR}{N} \qquad (1)$$

where:

$$\frac{VREF}{2}$$

is the reference voltage at the input 2186 of the amplifier 218;

$$\frac{In}{N}$$

is me current flowing through the pass transistor 217 (In is the current flowing through the low-side drive transistor 120 as shown as current source 244 in FIG. 2); and R is the resistance of the resistor 224.

The output voltage of the amplifier 218 is positive with respect to $$\frac{VREF}{2},$$

while the current flowing in the low-side drive transistor 120 is positive and negative. The switching network 234 and the difference amplifier 226 invert the output of the pass transistor 217 about $$\frac{VREF}{2}$$

when positive current is flowing in the low-side drive transistor 120.

Figure 3A:
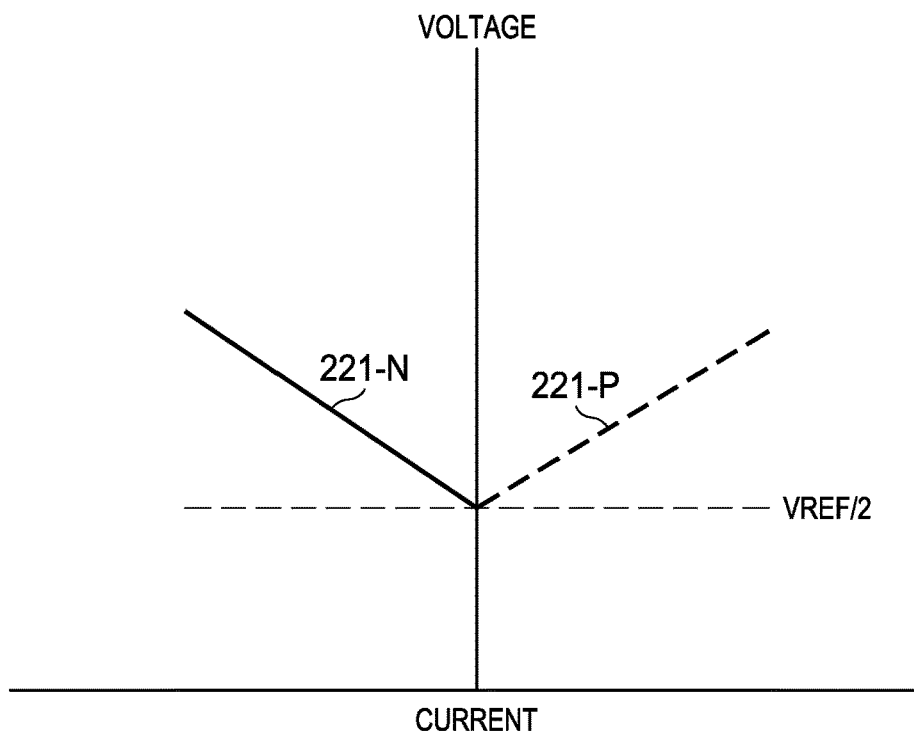
FIGS. 3A and 3B are current/voltage graphs of sense current in the current sense circuit of FIG. 2.
Figure 3B:
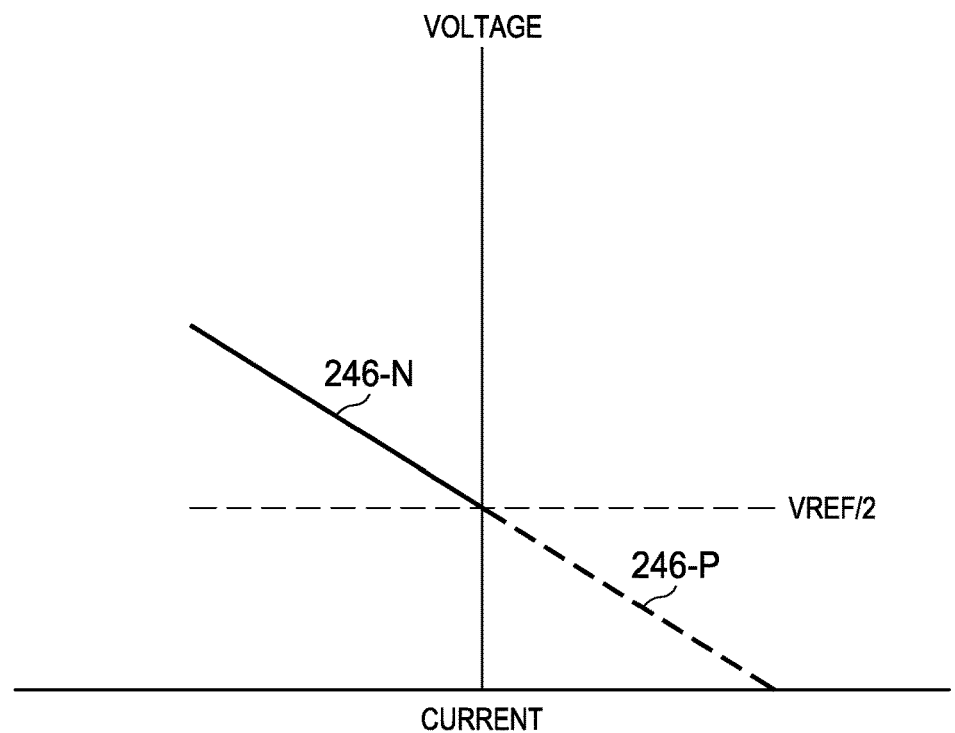

FIGS. 3A and 3B are graphs of current representative voltages in the current sense circuit 124. FIG. 3A is a graph of output voltage 221 (shown as 221-N and 221-P) of the amplifier 218, and FIG. 3B is a graph of sense voltage 246 (shown as 246-N and 246-P) output by the difference amplifier 226. The vertical and horizontal axes of FIGS. 3A and 3B represent voltage and current respectively. In FIG. 3A, voltage 221-N represents negative current flow in the low-side drive transistor 120, and voltage 221-P represents positive current flow in the low-side drive transistor 120. Both positive and negative current flows are represented as voltage above $$\frac{VREF}{2}.$$

That is, the output voltage 221 is proportional to the magnitude of the current flowing in the low-side drive transistor 120.

In FIG. 3B, the voltage 246-N represents negative current flow in the low-side drive transistor 120 and is derived from the voltage 221-N shown in FIG. 3A. The voltage 246-P represents positive current flow in the low-side drive transistor 120 and is derived from the voltage 221-P shown in FIG. 3A The switching network 234 and the difference amplifier 226 reflect the voltage 221-P, shown in FIG. 3A, about $$\frac{VREF}{2}$$

to produce the voltage 246-P, thereby producing the voltage output 246 which represents signed current flow through the low-side drive transistor 120.

The switching network 234 is coupled to the amplifier 218 and the difference amplifier 226, and routes the output voltage 221 and to the difference amplifier 226 based on the direction of current flow in the low-side drive transistor 120. If positive current is flowing in the low-side drive transistor 120, then the switching network 234 routes the output voltage 221 to the input 226A (inverting input) of the difference amplifier 226 through resistor 230 (R1), and routes $$\frac{VREF}{2}$$

to the input 226B (non-inverting input) of the difference amplifier 226 through a resistive divider formed by resistors 232 (R1) and 228 (R2). If negative current is flowing in the low-side drive transistor 120, then the switching network 234 routes the output voltage 221 to the input 226B of the difference amplifier 226 (through a resistive divider formed by resistors 232 (R1) and 228 (R2)), and routes $$\frac{VREF}{2}$$

to the input 226A of the difference amplifier 226 through resistor 230 (R1).

When negative current is flowing in the low-side drive transistor, the output of the difference amplifier 226 is:

$$\left(\frac{R2}{R1}\right)\left(\left(\frac{VREF}{2}+\frac{InR}{N}\right)-\left(\frac{VREF}{2}\right)\right)+\frac{VREF}{2}=\frac{VREF}{2}+\left(\frac{R2}{R1}\right)\left(\frac{InR}{N}\right) \quad (2)$$

where:
R1 is the resistance of the resistors 230 and 232; and
R2 is the resistance of the resistors 227 and 228.

When positive current is flowing in the low-side drive transistor, the output of the difference amplifier is:

$$\left(\frac{R2}{R1}\right)\left(\left(\frac{VREF}{2}\right)-\left(\frac{VREF}{2}+\frac{InR}{N}\right)\right)+\frac{VREF}{2}=\frac{VREF}{2}-\left(\frac{R2}{R1}\right)\left(\frac{InR}{N}\right) \quad (3)$$

Thus, the sense voltage 246 output by the difference amplifier 226 is inverted about $$\frac{VREF}{2}$$

when positive current is flowing in the low-side drive transistor 120, and represents the sign and magnitude of the current flowing through the low-side drive transistor 120.

The switching network 234 includes switches 236, 238, 240, and 242. A terminal 236A of the switch 236 and a terminal 238A of the switch 238 are coupled to the output 218C of the amplifier 218. A terminal 240A of the switch 240 and a terminal 242A of the switch 242 are coupled to the reference voltage source providing $$\frac{VREF}{2}.$$

A terminal 236B of the switch 236, and a terminal 240B of the switch 240 are coupled to an input 226A of the difference amplifier 226. A terminal 238B of the switch 238 and a terminal 242B of the switch 242 are coupled to an input 226B of the difference amplifier 226. A control terminal 236C of the switch 236 and a control terminal 242C of the switch 242 are coupled to the output 220C (SEL) of the comparator 220. A control terminal 238C of the switch 238 and a control terminal 240C of the switch 240 are coupled to the output 222B (SEL_B) of the inverter 222.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While particular transistor structures are referred to above, other transistors or device structures may be used instead. For example, other types of transistors (such as bipolar junction transistors, BJTs) may be utilized in place of the transistors shown. Additionally, the transistors may be implemented using NPN transistors, PNP transistors, pMOSFETs and/or nMOSFETS with little or no modifications. The capacitors may be implemented using different device structures (such as metal structures formed over each other to form a parallel plate capacitor) or may be formed on layers (metal or doped semiconductors) closer to or farther from the semiconductor substrate surface.

As used herein, the terms "terminal", "node", "interconnection", "lead" and "pin" are used interchangeably. Unless specifically stated to the contrary, these terms are generally used to mean an interconnection between or a terminus of a device element, a circuit element, an integrated circuit, a device or other electronics or semiconductor component.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

Modifications are possible in the described embodiments, and other embodiments are possible, within the scope of the claims.

What is claimed is:

1. A motor driver, comprising:
    a low-side drive transistor including:
        a control terminal;
        a first current terminal coupled to a ground; and
        a second current terminal;
    a sense transistor including
        a control terminal coupled to the control terminal of the low-side drive transistor;
        a first current terminal; and
        a second current terminal;
    a comparator including:
        a first input coupled to the second current terminal of the low-side drive transistor;
        a second input coupled to the ground; and
        an output;
    a first switch including:
        a first terminal coupled to the second current terminal of the low-side drive transistor;
        a second terminal coupled to the second current terminal of the sense transistor; and
        a control terminal coupled to the output of the comparator; and
    a second switch including:
        a first terminal coupled to the first current terminal of the sense transistor;
        a second terminal coupled to the ground; and
        a control terminal coupled to the output of the comparator.

2. The motor driver of claim 1, further comprising:
    a sense amplifier having a first input, a second input, and an output;
    a third switch including:
        a first terminal coupled to the second current terminal of the low-side drive transistor;
        a second terminal coupled to the first input of the sense amplifier; and
        a control terminal coupled to the output of the comparator; and
    a fourth switch including:
        a first terminal coupled to the ground;
        a second terminal coupled to the first input of the sense amplifier; and
        a control terminal coupled to the output of the comparator.

3. The motor driver of claim 2, further comprising:
    a fifth switch including:
        a first terminal coupled to the second input of the sense amplifier;
        a second terminal coupled to the second current terminal of the sense transistor; and
        a control terminal coupled to the output of the comparator; and
    a sixth switch including:
        a first terminal coupled to the second input of the sense amplifier;
        a second terminal coupled to the first current terminal of the sense transistor; and
        a control terminal coupled to the output of the comparator.

4. The motor driver of claim 2, further comprising:
    a pass transistor including:
        a control terminal coupled to the output of the sense amplifier;
        a first current terminal coupled to the second input of the sense amplifier; and
        a second current terminal.

5. The motor driver of claim 4, further comprising:
    a current-to-voltage converter circuit, including:
        a first input coupled to the second current terminal of the pass transistor;
        a second input coupled to a reference voltage source; and
        an output coupled to the first input of the current-to-voltage converter circuit.

6. The motor driver of claim 5, further comprising:
    a seventh switch including:
        a first terminal coupled to the output of the current-to-voltage converter circuit;
        a second terminal; and
        a control terminal coupled to the output of the comparator;
    an eighth switch including:
        a first terminal coupled to the output of the current-to-voltage converter circuit;
        a second terminal; and
        a control terminal coupled to the output of the comparator;
    a ninth switch including:
        a first terminal coupled to the reference voltage source;
        a second terminal to the second terminal of the seventh switch; and
        a control terminal coupled to the output of the comparator; and
    a tenth switch including:
        a first terminal coupled to the reference voltage source;
        a second terminal to the second terminal of the eighth switch; and
        a control terminal coupled to the output of the comparator.

7. The motor driver of claim 6, further comprising:
    a difference amplifier, including:
        a first input coupled to the second terminal of the seventh switch; and
        a second input coupled to the second terminal of the eighth switch.

8. A motor driver, comprising:
    a low-side drive transistor adapted to be coupled to a motor;
    a comparator having a first input coupled to a first current terminal of the low-side transistor and configured to determine a direction of a drive current flowing through the low-side drive transistor;
    a sense transistor coupled to the low-side drive transistor and configured to pass a replica of the drive current;
    a first switch configured to couple the sense transistor to the low-side drive transistor responsive to the drive current flowing in a first direction through the low-side drive transistor; and a second switch configured to couple the sense transistor to a ground responsive to the drive current flowing in a second direction, that is opposite the first direction, through the low-side drive transistor.

9. The motor driver of claim 8, further comprising:
a sense amplifier having a first input, a second input, and an output;
a third switch configured to couple the first input of the sense amplifier to the low-side drive transistor responsive to the drive current flowing in the second direction through the low-side drive transistor; and
a fourth switch configured to couple the first input of the sense amplifier to the ground responsive to the drive current flowing in the first direction through the low-side drive transistor.

10. The motor driver of claim 9, further comprising:
a fifth switch configured to couple the second input of the sense amplifier to the sense transistor responsive to the drive current flowing in the second direction through the low-side drive transistor; and
a sixth switch configured to couple the second input of the sense amplifier to the sense transistor responsive to the drive current flowing in the first direction through the low-side drive transistor.

11. The motor driver of claim 10, further comprising:
a pass transistor controlled by the output of the sense amplifier and configured to pass the replica of the drive current to the second input of the sense amplifier.

12. The motor driver of claim 11, further comprising:
a current-to-voltage converter circuit configured to convert the replica of the drive current to an output voltage.

13. The motor driver of claim 12, further comprising:
a difference amplifier configured to:
invert the output voltage of the current-to-voltage converter circuit relative to a reference voltage responsive to the drive current flowing in the first direction through the low-side drive transistor.

14. The motor driver of claim 13, further comprising:
a switching network configured to:
route the reference voltage to a first input of the difference amplifier and route the output of the current-to-voltage converter circuit to a second input of the difference amplifier responsive to the drive current flowing in the first direction through the low-side drive transistor; and
route the reference voltage to the second input of the difference amplifier and route the output of the current-to-voltage converter circuit to the first input of the difference amplifier responsive to the drive current flowing in the second direction through the low-side drive transistor.

15. A motor driver, comprising:
a sense transistor adapted to be coupled to a low-side drive transistor, and configured to pass a sense current that is proportional to a drive current flowing through the low-side drive transistor in a first direction and in a second direction;

a sense amplifier coupled to the sense transistor and configured to sense a voltage across the sense transistor;
a current-to-voltage converter coupled to the sense amplifier and configured to convert the sense current to a sense voltage; and
a difference amplifier coupled to the current-to-voltage converter and configured to invert the sense voltage relative to a reference voltage responsive to the drive current flowing in the first direction through the low-side drive transistor.

16. The motor driver of claim 15, further comprising:
a first switch configured to couple the sense transistor to the low-side drive transistor responsive to the drive current flowing in the first direction through the low-side drive transistor; and
a second switch configured to couple the sense transistor to a ground responsive to the drive current flowing in a second direction, that is opposite the first direction, through the low-side drive transistor.

17. The motor driver of claim 15, further comprising:
a first switch configured to couple a non-inverting input of the sense amplifier to the low-side drive transistor responsive to the drive current flowing in the second direction through the low-side drive transistor; and
a second switch configured to couple the non-inverting input of the sense amplifier to a ground responsive to the drive current flowing in the first direction through the low-side drive transistor.

18. The motor driver of claim 15, further comprising:
a fifth switch configured to couple an inverting input of the sense amplifier to the sense transistor responsive to the drive current flowing in the second direction through the low-side drive transistor; and
a sixth switch configured to couple the inverting input of the sense amplifier to the sense transistor responsive to the drive current flowing in the first direction through the low-side drive transistor.

19. The motor driver of claim 15, further comprising:
a pass transistor controlled by the output of the sense amplifier and configured to pass the sense current to the sense transistor.

20. The motor driver of claim 15, further comprising:
a switching network configured to:
route a reference voltage to an inverting input of the difference amplifier and route the output of the current-to-voltage converter to a non-inverting input of the difference amplifier responsive to the drive current flowing in the first direction through the low-side drive transistor; and
route the reference voltage to the non-inverting input of the difference amplifier and route the output of the current-to-voltage converter to the inverting input of the difference amplifier responsive to the drive current flowing in the second direction through the low-side drive transistor.

* * * * *